(12) United States Patent
Su

(10) Patent No.: US 7,505,048 B2
(45) Date of Patent: Mar. 17, 2009

(54) ESTIMATION OF OVERLAP OF POLYGONS

(75) Inventor: Philip Ti-Fei Su, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 161 days.

(21) Appl. No.: 10/423,533

(22) Filed: Apr. 25, 2003

(65) Prior Publication Data

US 2004/0211071 A1    Oct. 28, 2004

(51) Int. Cl.
  *G09G 5/00* (2006.01)
  *G06T 11/20* (2006.01)
(52) U.S. Cl. .................... 345/629; 345/441; 345/630
(58) Field of Classification Search ......... 345/620–639, 345/441
  See application file for complete search history.

(56) References Cited

U.S. PATENT DOCUMENTS

| | | | | |
|---|---|---|---|---|
| 5,438,656 A * | 8/1995 | Valdes et al. | ................ | 345/443 |
| 5,471,578 A * | 11/1995 | Moran et al. | ................ | 715/863 |
| 5,485,565 A * | 1/1996 | Saund et al. | ................ | 345/442 |
| 5,506,946 A * | 4/1996 | Bar et al. | ................ | 345/600 |
| 5,583,542 A * | 12/1996 | Capps et al. | ................ | 345/173 |
| 5,592,608 A * | 1/1997 | Weber et al. | ................ | 715/863 |
| 5,594,810 A * | 1/1997 | Gourdol | ................ | 382/187 |
| 5,655,136 A * | 8/1997 | Morgan | ................ | 382/187 |
| 5,694,532 A * | 12/1997 | Carey et al. | ................ | 345/419 |
| 5,732,358 A * | 3/1998 | Sawaya et al. | ................ | 455/525 |
| 5,796,634 A * | 8/1998 | Craport et al. | ................ | 702/150 |
| 5,867,150 A * | 2/1999 | Bricklin et al. | ................ | 345/173 |
| 6,252,974 B1 * | 6/2001 | Martens et al. | ................ | 382/107 |
| 6,373,995 B1 * | 4/2002 | Moore | ................ | 382/284 |
| 6,466,229 B1 * | 10/2002 | Nagao | ................ | 345/621 |
| 6,625,333 B1 * | 9/2003 | Wang et al. | ................ | 382/300 |
| 6,631,266 B1 * | 10/2003 | Lee et al. | ................ | 455/446 |
| 6,687,876 B1 * | 2/2004 | Schilit et al. | ................ | 715/512 |
| 6,795,069 B2 * | 9/2004 | Raskar et al. | ................ | 345/419 |
| 6,839,466 B2 * | 1/2005 | Venable | ................ | 382/199 |
| 2002/0145616 A1 * | 10/2002 | Doan | ................ | 345/629 |
| 2003/0025696 A1 * | 2/2003 | Mulgan | ................ | 345/440 |
| 2003/0179214 A1 * | 9/2003 | Saund et al. | ................ | 345/619 |
| 2003/0179235 A1 * | 9/2003 | Saund et al. | ................ | 345/764 |

(Continued)

OTHER PUBLICATIONS

Hoff, Kenneth E. "Faster 3D Game Drawing by Not Drawing What Is Not Seen." ACM Crossroads May 1997. vol. 3, Issue 4.*

(Continued)

*Primary Examiner*—Ulka Chauhan
*Assistant Examiner*—Jeffrey J Chow
(74) *Attorney, Agent, or Firm*—Birch, Stewart, Kolasch & Birch, LLP

(57) ABSTRACT

Various techniques are disclosed for easily and accurately estimating the amount of overlap between two or more polygons. With various examples of these techniques, a pattern of objects, such as points, is provided over the entire area of the first polygon. The amount of objects within the first polygon then is determined, as is the amount of objects within the first polygon that also are located within the second polygon. The ratio of the amount of objects located within both the first polygon and the second polygon to the total amount of objects located within the first polygon then provides an estimate of the amount of the first polygon overlapped by the second polygon.

20 Claims, 5 Drawing Sheets

U.S. PATENT DOCUMENTS

| | | | |
|---|---|---|---|
| 2003/0214536 A1* | 11/2003 | Jarrett et al. | 345/831 |
| 2004/0054701 A1* | 3/2004 | Garst | 708/131 |
| 2004/0127224 A1* | 7/2004 | Furukawa et al. | 455/446 |
| 2005/0198590 A1* | 9/2005 | Jarrett et al. | 715/863 |
| 2005/0198591 A1* | 9/2005 | Jarrett et al. | 715/863 |

OTHER PUBLICATIONS

NCGIA. (1997). The polygon overlay operation, NCGIA Core Curriculm in GIScience, published originally in M.F. Goodchild and K.K. Kemp, eds., 1990, in NCGIA Core Curriculm in GIS, National Center for Geographic Info. and Anal., UCSB, Unit 34.*

Open University study, UK. "Exemplar Data: Adaptive Sampling." http://www.open.ac.uk/daptf/docs/cluster.pdf.*

Foley, James D. et al. "Computer Graphics: Principles and Practice." Addison-Wesley Publishing Co., 1996. various pages.*

WMS 6.1 From EMS-1 company, 2001-2002, from Internet Archive. See URLs on bottom of pages.*

"Coverage Overlays". From EMS-1 company, 2005, URL listed on bottom of page.*

"Sample". From Quantdec company, Plug-in for ArcView 3.2. http://www.quantdec.com/sample—from Internet Archive, date before applicant's filing date—from.*

"Analysis of Geographic Data". From GlSdevelopment.net, a tutorial. From Internet Archive—2002 date. See URL at bottom of page.*

"Lecture 12: Analysis(2): Transformations". Lecture from UCSB's geography class. From Internet Archive, 2002.*

"Lab #2: GIS Overlay Analysis". From www.cnr.uidaho.edu/rsgis/sylabus_NR506.pdf from University of Idaho's Fire Lab, specifically a GIS course.*

"Sample". From Quantdec company, Plug-in for ArcView 3.2. http://www.quantdec.com/sample, Aug. 30, 2000.*

"Poly-Shape: lines-to-polygons transformation for ArcVie", http://www.spatial-online.com/ProductDescriptions/lfer/Polyshape_description_www.pdf, Nov. 11, 1998.*

J. Maurer et al., "A Novel Approach in the Determination of Visible Surfaces in 3D Vector Geometries for Ray-Optical Wave Propagation Modeling," IEEE, 2000, pp. 1651-1655.

C. Fahn et al., "Efficient Time-Interrupted and Time-Continuous Collision Detection Among Polyhedral Objects in Arbitrary Motion," Journal of Information Science and Engineering, 1999, pp. 769-799.

D. Bradshaw et al., "Combined Affine and Translational Motion Compensation Scheme Using Triangular Tessellations," IEEE 1997, pp. 2645-2648.

R. Grinde et al., "A New Algorithm for the Two-Polygon Containment Problem," Computers Ops Res. vol. 24, No. 3, 1997, pp. 231-251.

D. Mount, "Intersection Detection and Separators for Simple Polygons," 8th Annual Computational Geometry, Jun. 1992, pp. 303-311.

W. Liou et al., "Minimum Partitioning Simple Rectilinear Polygons in O(nloglogn)-Time," ACM, 1989, pp. 344-353.

M. Segal et al., "Partitioning Polyhedral Objects into Nonintersecting Parts," IEEE Computer Graphics and Applications, 1988, pp. 53-67.

A. Appel et al., "Rectangle Overlap Test and Partitioning Technique," IBM Technical Disclosure Bulletin, vol. 18, No. 10, Mar. 1976, pp. 3453-3455.

K Grau et al., "General Shading Model for Solar Building Design," ASHRAE Transactions: Symposia, 1995, pp. 1298-1310.

E. Sandgren et al., "Part Layout Optimization Using a Quadtree Representation," ASME Design Automation Conference, 1988, pp. 211-219.

* cited by examiner

ESTIMATION OF OVERLAP OF POLYGONS

FIELD OF THE INVENTION

Aspects of the present invention are directed to techniques for estimating the overlap of polygons. More particularly, aspects of the present invention are directed to techniques for quickly, efficiently, and accurately estimating the amount of a first rendered polygon that is overlapped by a second rendered polygon.

BACKGROUND OF THE INVENTION

As the functionality and sophistication of computers has increased, the functionality and sophistication of the user interfaces employed by computers has increased as well. One common type of interface for computers is the graphical user interface. With this type of interface, information retrieved from and provided to the computer is pictographically represented by images. These images are typically rendered using a wide variety of differently-shaped polygons.

The process of rendering and manipulating polygons on a display may often require determining the amount of overlap between polygons. For example, in some situations, a first polygon may form the bounding area for content rendered on a display. A second polygon may then represent a selection area, for defining information that is to be selected in a selection process. The selection process may, for example, select content when more than 60% of the bounding area for that content is overlapped by the selection area. The polygon used to define this type of selection area is sometimes referred to as a selection "lasso".

Conventionally, relatively complex algorithms have been employed to determine the amount of overlap of two polygons. For example, the Weiler-Atherton method is one commonly-used technique for determining an amount of overlap between two polygons. More particularly, the Weiler-Atherton method can be used to identify the area formed by the overlap of one polygon with another. This area can then be compared with the area of one of the polygons, to determine how much of that polygon is overlapped by the other polygon. These conventionally-employed methods, however, typically require a great deal of processing power to perform, and thus are relatively slow to implement. Moreover, some of these methods are error prone due to their complexity. Accordingly, there is a need for a relatively quick, efficient and accurate technique for determining the overlap between two polygons.

SUMMARY OF THE INVENTION

Advantageously, various examples of the invention provide techniques for easily and accurately estimating the amount of overlap between two or more polygons rendered on a display. With various examples of the invention, a pattern of objects, such as points, is provided over the entire area of the first polygon. The amount of objects within the first polygon then is determined, as is the amount of objects within the first polygon that also are located within the second polygon. The ratio of the amount of objects located within both the first polygon and the second polygon to the total amount of objects located within the first polygon then provides an estimate of the amount of the first polygon overlapped by the second polygon.

A variety of techniques may be employed to provide the pattern of objects over the area of the first polygon. With some implementations of the invention, for example, the first polygon may be a simple polygon, such as a square or rectangle. With this type of polygon, the objects may be easily provided in a regular grid pattern simply by placing the objects at regular intervals in the direction of both the height and width of the polygon. With other examples of the invention that employ irregularly-shaped polygons, however, the objects may be provided over the entire area of the first polygon by determining a dimension of the first polygon, such as its height, and then creating a plurality of parallel lines spaced along that dimension. The objects are located along the portions of each line within the polygon to create the pattern of objects. Of course, still other techniques for providing the pattern of objects alternately or additionally may be employed.

BRIEF DISCRTION OF THE DRAWING

The invention is described below in more detail in connection with the attached figures, which illustrate various examples of aspects of the invention. In the figures.

DETAILED DESCRIPTION OF THE DRAWINGS

Introduction

As will be discussed in detail below, various examples of the invention are directed toward techniques for determining the amount that one polygon is overlapped by another polygon using a pattern of objects, such as points, provided over the entire area of the overlapped polygon. Accordingly, an operating environment in which different examples of the invention may be implemented will be discussed first, together with tools for determining the amount of overlap between two polygons. Methods for determining the amount that one polygon is overlapped by another polygon will then be discussed, as well as various techniques for providing the pattern of objects according to various examples of the invention.

Exemplary Operating Environment

As will be appreciated by those of ordinary skill in the art, various techniques for determining the overlap of polygons according to various examples of the invention may be implemented using software. That is, tools for estimating the overlap of two or more polygons according to the invention may be described in the general context of computer-executable instructions, such as program modules, executed by one or more computing devices. Generally, program modules include routines, programs, objects, components, data structures, etc. that perform particular tasks or implement particular abstract data types. Typically the functionality of the program modules may be combined or distributed as desired in various embodiments.

Figure 1:
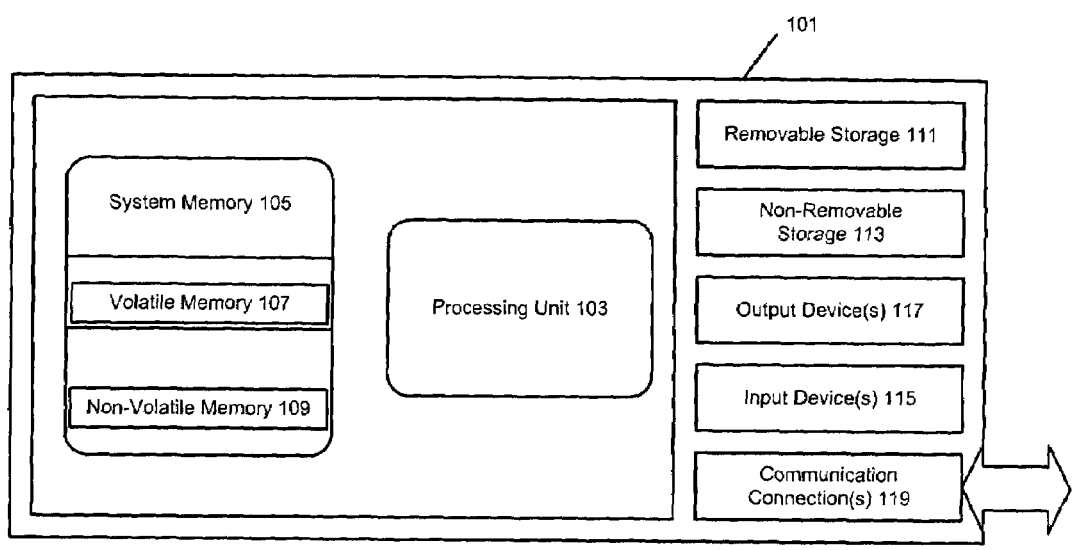
FIG. 1 shows a schematic diagram of a general-purpose digital computing environment that can be used to implement various aspects of the invention.

Because the invention may be implemented using software, it may be helpful for a better understanding of the invention to briefly discuss the components and the operation of a typical programmable computer on which various examples of the invention may be employed. FIG. 1 illustrates an example of a computing device 101 that provides a suitable operating environment in which various examples of the invention may be implemented. This operating environment is only one example of a suitable operating environment, and it is not intended to suggest any limitation as to the scope of use or functionality of the invention. Other computing systems, environments, and/or configurations, including conventional computing systems, environments, and/or configurations known in the art, may be suitable for use with the invention. Such example systems, environments, and/or configurations include, but are not limited to: personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing device 101 typically includes at least some form of computer-readable media. Computer-readable media can be any available media that can be accessed by the computing device 101. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to: RAM, ROM, EEPROM, flash memory or other memory technology; CD-ROM, digital versatile disks (DVD) or other optical storage devices; magnetic cassettes, magnetic tape, magnetic disk storage or other magnetic storage devices; holographic storage; or any other medium that can be used to store the desired information and can be accessed by the computing device 101.

The computing device 101 typically includes at least some form of computer-readable media. Computer-readable media can be any available media that can be accessed by the computing device 101. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to: RAM, ROM, EEPROM, flash memory or other memory technology; CD-ROM, digital versatile disks (DVD) or other optical storage devices; magnetic cassettes, magnetic tape, magnetic disk storage or other magnetic storage devices; holographic storage; or any other medium that can be used to store the desired information and can be accessed by the computing device 101.

Communication media typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above also should be included within the scope of the term "computer-readable media" as used in this specification.

With reference to FIG. 1, in its most basic configuration the computing device 101 typically includes a processing unit 103 and system memory 105. Depending on the exact configuration and type of computing device 101, the system memory 105 may include volatile memory 107 (such as RAM), non-volatile memory 109 (such as ROM, flash memory, etc.), or some combination of the two memory types. Additionally, computing device 101 also may have mass storage devices, such as a removable storage device 111, a non-removable storage device 113, or some combination of these two storage device types. The mass storage devices can be any device that can retrieve stored information, such as magnetic or optical disks or tape, or holographic storage. As will be appreciated by those of ordinary skill in the art, the system memory 105 and mass storage devices 111 and 113 are examples of computer storage media.

The computing device 101 typically will have one or more input devices 115 as well, such as a keyboard, microphone, scanner or pointing device, for receiving input from a user. The computing device 101 also typically will have one or more output devices 117 for outputting data to a user, such as a display, a speaker, printer or a tactile feedback device. Other components of the device 101 may include communication connections 119 to other devices, computers, networks, servers, etc. using either wired or wireless media. As will be appreciated by those of ordinary skill in the art, the communication connections 119 are examples of communication media. All of these devices and connections may be comprised of devices and connections well known in the art and thus will not be discussed at further length here.

Estimation of Overlap

Figure 2:
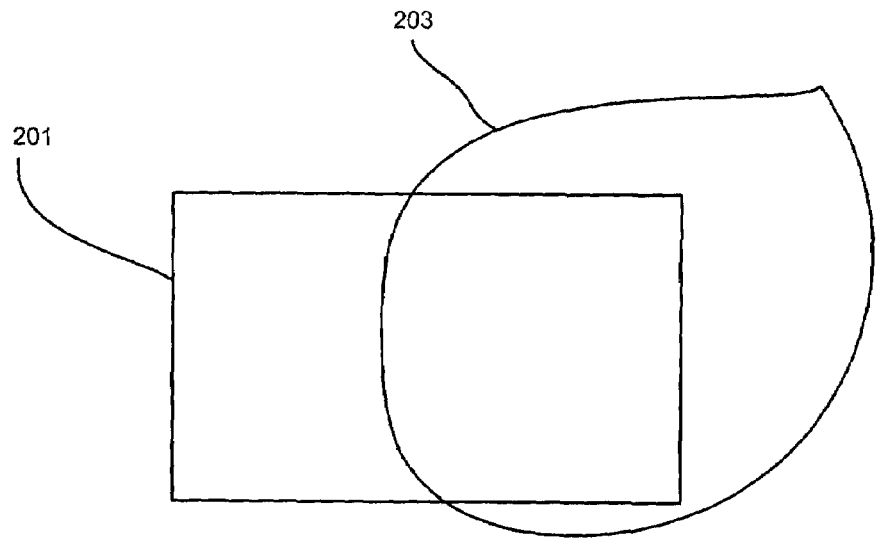
FIG. 2 shows an example of one polygon overlapping another polygon.
Figure 3:
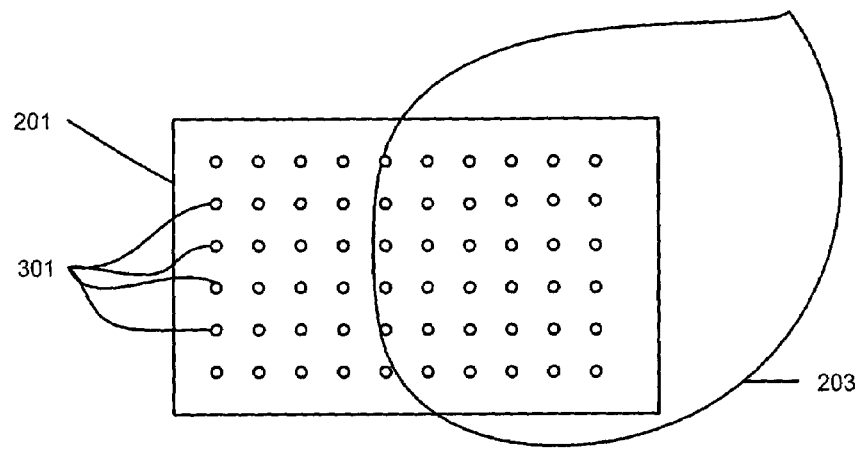
FIG. 3 shows an example of an overlapped polygon with a regular pattern of points.

Turning now to FIG. 2, this figure illustrates the overlap of a first polygon 201 with a second polygon 203. As may be appreciated from this figure, it is difficult to accurately estimate the amount of overlap between polygon 201 and polygon 203. As will be discussed in detail below, various examples of the invention provide a pattern of objects, such as points, over the entire area of one of the polygons. For example, as illustrated in FIG. 3, a pattern of points 301 may be provided over the entire area of polygon 201. According to different examples of the invention, the total number of objects within polygon 201 is determined, as is the number of these objects that also are located within polygon 203. For example, as shown in FIG. 3, the polygon 201 contains a total of 60 points, while 35 of those points also are located within the polygon 203. The ratio of the number of points located within both the polygon 201 and the polygon 203 to the total number of points within the polygon 201, which in this case is 58.3% (i.e., 35/60), provides an estimate of the overlap between polygon 203 and polygon 201. Thus, the polygon 203 overlaps 58.3% of the polygon 201.

Figure 4:
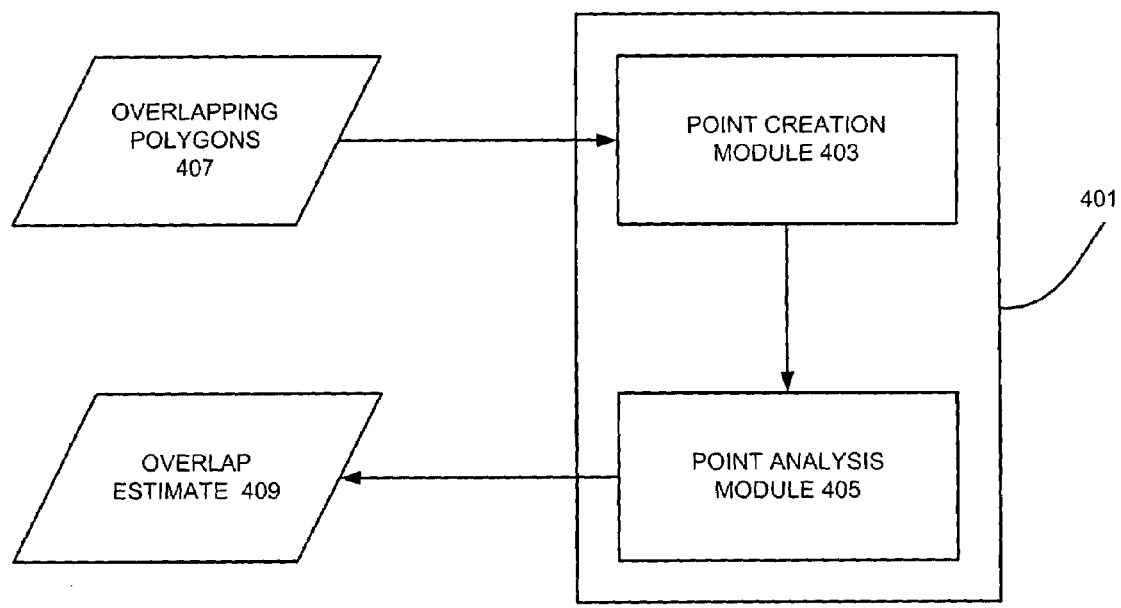
FIG. 4 shows an example of a tool for estimating the overlap of a first polygon with a second polygon.

FIG. 4 illustrates an example of a tool 401 for estimating the overlap of polygons that may use, for example, the method described above in connection with FIG. 3. As seen in this figure, the tool 401 includes a point creation module 403 that creates a pattern of points (or other objects) over the entire area of a first polygon, such as the polygon 201, defined in a set of overlapping polygons 407. The tool 401 also includes a point analysis module 405. The point analysis module 405 determines both the total number of points located within the first polygon and the number of those points that are located within the second polygon as well. The point analysis module 405 then determines the ratio of the number of points located within both the first polygon and the second polygon to the total number of points located within the first polygon, and provides this ratio as the overlap estimate 409.

Figure 5:
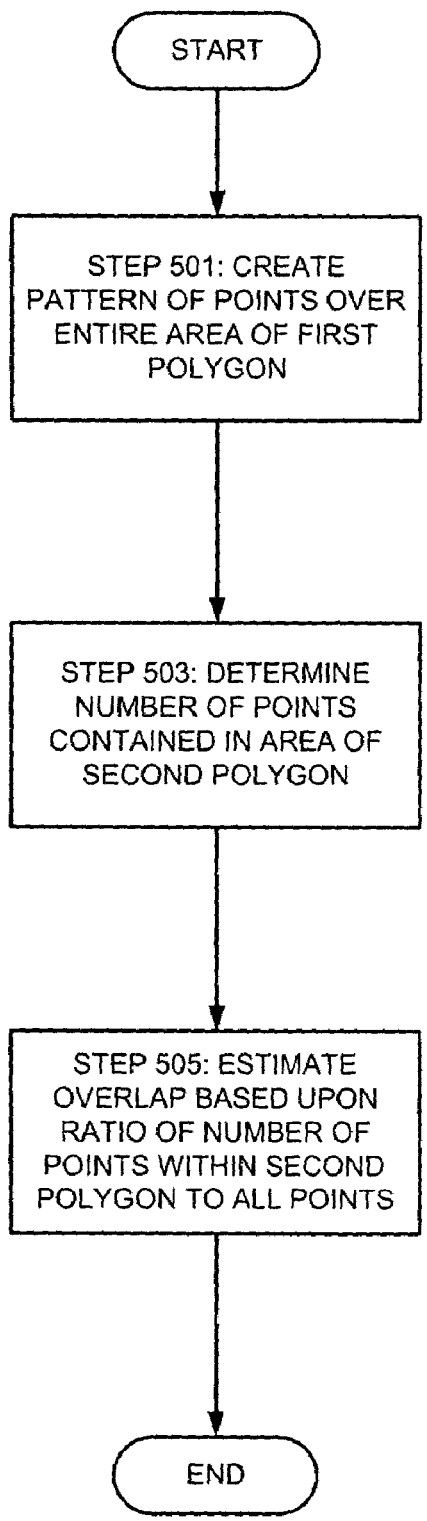
FIG. 5 shows a flowchart describing an example procedure for estimating an overlap of a first polygon with a second polygon.

One particular method for determining the overlap of polygons that may be employed by various examples of the invention, such as the tool 401, is described in the flow chart illustrated in FIG. 5. As seen in this figure, in step 501, a pattern of points is created over the entire area of a first polygon. With various examples of the invention, the pattern of points may be a regular pattern of points, with each point in the pattern positioned at a fixed distance from each adjacent point. As desired, the fixed distance in one direction (e.g., the X-coordinate direction) may be the same as or different from the fixed distance in another direction (e.g., the Y-coordinate direction). With still other examples of the invention, however, the pattern of points may be a random pattern. For example, a random pattern of points may be employed where the overall density of the points is sufficiently high that any two substantially equal areas of the pattern will include approximately the same number of points. Further, with some examples of the invention, the pattern of points may contain a fixed number of points, regardless of the size of the first polygon. Thus, if the pattern of points contains 25 points, those points will be evenly distributed over the area of the first polygon regardless of its size. Still other examples of the invention, however, may create the pattern of points using regular periodically occurring points, so that the number of points in the first polygon will depend upon the overall size of the polygon itself.

With some examples of the invention, the pattern of objects may already exist over the entire area of the first polygon. For example, both the Microsoft® Visio® computer-aided drawing software application and the Microsoft® Windows Journal software application allow a user to select a grid background for a user interface. Thus, if the first and second polygons are rendered by a user interface employing this type of grid pattern, then the intersection of the grid lines may conveniently be used as points to determine the amount that the first polygon is overlapped by the second polygon. Also, if the polygons are to be rendered on a display device, then the pixels to be rendered may be used as the objects to determine the amount of overlap. Thus, for these examples of the invention, the step 501 of creating the pattern of objects may be omitted. Similarly, when a tool determining the amount of overlap of a polygon, such as the tool 401, is employed with these examples of the invention, then the point creation module 403 may be omitted.

It should also be noted that, while the pattern of objects extends over the entire area of the first polygon, the pattern of objects may or may not be limited to the area of the first polygon. For example, with some implementations of the invention, a pattern of objects (such as points) may be distributed over an entire area of a user interface in which the first polygon is rendered, and thus include objects outside of the first polygon. With these implementations, the number of objects falling within the first polygon are determined and identified. For example, each object in the pattern may be individually tested to determine if it falls within the perimeter of the first polygon. A variety of well-known techniques have been developed for quickly and efficiently determining whether a point falls within or outside of a polygon area, and any of these techniques may be employed by various examples of the invention. If an object is located within the first polygon, then the object is identified for future reference. The objects outside of the first polygon may then subsequently be ignored.

Next, in step 503, the amount of objects contained within the area of the second polygon is determined. This determination may be made in any suitable manner without departing from the invention. For example, when the objects are an arrangement of points, this determination may be made by individually testing each point located within the first polygon, to ascertain if that point also is encompassed by the second polygon. As previously noted, a variety of well-known techniques have been developed for quickly and efficiently determining whether a point falls within or outside of a polygon area, and any of these techniques may be employed by various examples of the invention.

In step 505, the ratio of the amount of objects that have been determined to be within the area of the second polygon to the total amount of objects located within the area of the first polygon is determined. For example, if the objects are points, then the number of points that have been determined to be within the area of both the first polygon and the second polygon to the total number of points located within the area the first polygon is determined. This ratio thus provides an estimate of the amount that the second polygon overlaps the first polygon. It should be noted that the ratio can be expressed in any suitable manner. For example, the ratio can be expressed as a relationship between a numerator and a denominator, a real number (such as a number having a decimal point), or as a percentage value.

It also should be noted that, with various examples of the invention, the determined amount of objects within the first polygon (and within both the first and second polygons) does not necessarily need to be a number of discrete objects. Instead, some implementations of the invention may determine the portion of each object falling within the first polygon, and then may similarly determine a portion of each of those object portions that also falls within the second polygon. For example, the pattern of objects may be a set of parallel lines extending across the first polygon. The amount of objects within the first polygon may then be the total cumulative length of the lines falling within the first polygon. The amount of those objects that also is located in the second polygon similarly will be the total cumulative length of the lines falling within the first polygon and the second polygon.

Providing the Pattern of Objects

Figure 6:
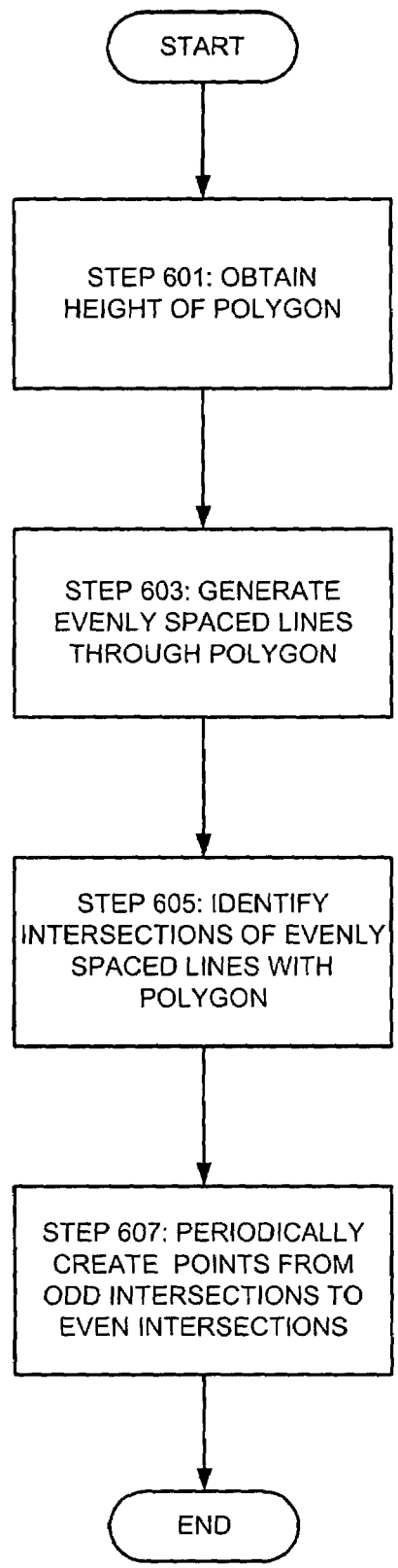
FIG. 6 shows a flowchart describing an example procedure for creating a regular pattern of points within a polygon.

As will be appreciated by those of ordinary skill in the art, any suitable technique for providing the pattern of points (or other objects) over the entire area of the first polygon may be employed with different examples of the invention. If, for example, the first polygon is a rectangle or square, then a simple grid pattern can be employed to evenly distribute points within the area of the first polygon. If, however, the first polygon is an irregularly-shaped polygon, then other techniques may be employed to evenly distribute the pattern of points throughout the first polygon. One such technique that may be employed by various examples of the invention is described by the flowchart illustrated in FIG. 6.

Figure 7:
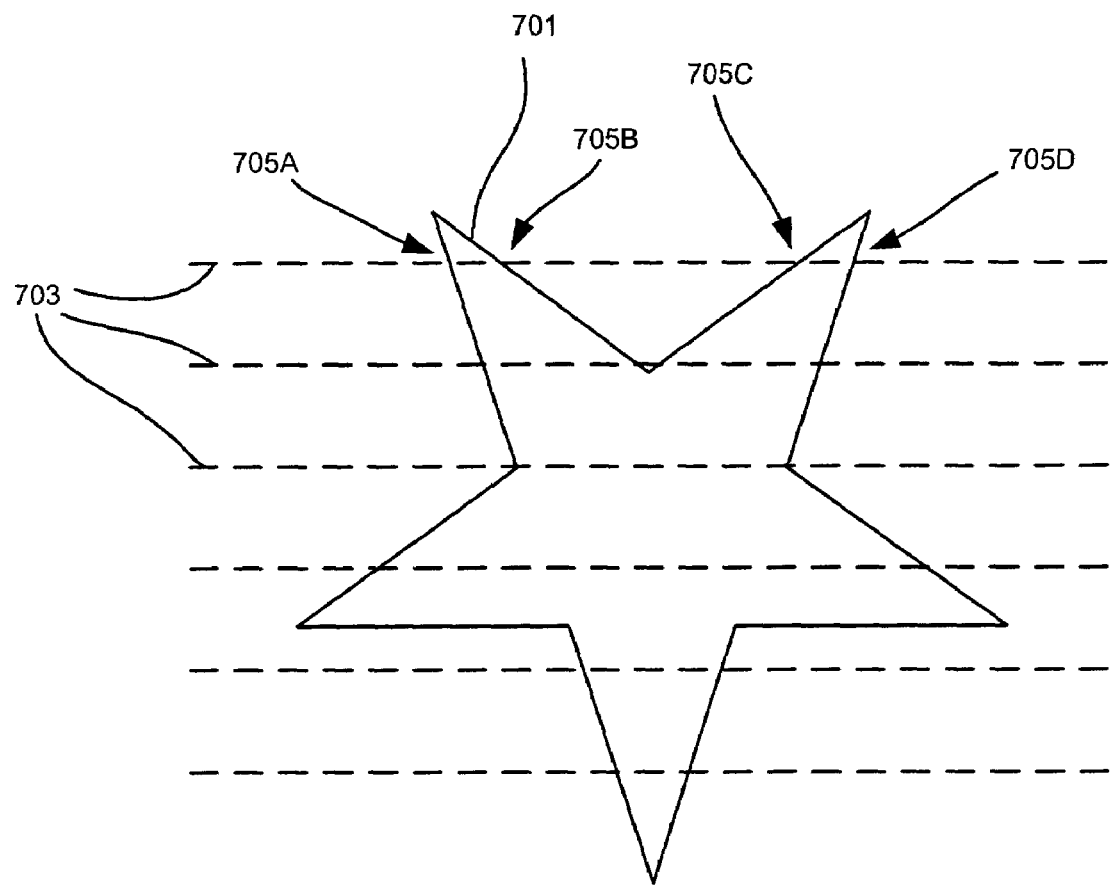
FIG. 7 shows an example of lines for creating a regular pattern of points within an irregularly-shaped polygon.

As seen in this flowchart, in step 601 a dimension of a polygon, such as its height or width, is obtained. For example, referring to the polygon 701 illustrated in FIG. 7, the height of the polygon 701 first may be determined. Next, in step 603, evenly spaced parallel lines are generated along the selected dimension of the polygon. Thus, as illustrated in FIG. 7, a plurality of parallel lines 703 are created, which are evenly spaced along the height of the polygon 701. As will be appreciated by those of ordinary skill in the art, these lines typically are not rendered to the user for viewing. The lines 703 are therefore illustrated with dotted lines in FIG. 7.

Next, in step 605, the intersections of the lines with the polygons are identified. For example, the top most line 703 has a first intersection 705A with the polygon 701, a second intersection 705B with the polygon 701, a third intersection 705C with the polygon 701, and a fourth intersection 705D with the polygon 701.

Finally, in step 607, points are created along each parallel line between odd-numbered intersections of the line with the polygon and even-numbered intersections of the line with the polygon. Thus, referring back to the example illustrated in FIG. 7, points are created on the top-most line 703 between the first intersection 705A and the second intersection 705B. Similarly, points are created on the top-most line 703 between the third intersection 705C and the fourth intersection 705D. As will be appreciated from viewing this figure, placing points between the odd-numbered and even-numbered intersections of the line with the polygon ensures that the points are located within the area of the polygon, rather than outside of the boundaries of the polygon.

The points may be periodically located according to, for example, the desired distance between adjacent points. Thus, with some examples of the invention, the points may be periodically placed to obtain a desired pointed density. With these examples, a point may be provided, for example, along a parallel line every five pixels starting from the odd-numbered intersection of the line with the polygon and ending with the even-numbered intersection of the line with the polygon. With alternate examples of the invention, however, the points may be located to ensure their even distribution while maintaining a fixed total number of points contained within the polygon. Further, with some examples of the invention, the periodic placement of points may be altered, for example, to ensure that a portion of the polygon is not omitted when estimating the overlap with another polygon. Some examples of the invention may ensure that each line segment between the odd-numbered intersections of a line with the polygon and the next even-numbered intersection of the line with the polygon includes at least one point.

The above description and drawings of various example systems and methods according to the invention describe and illustrate various polygons with the objects (e.g., points) rendered within at least one of the polygons. This is provided as an aid for illustrating understanding the invention. Of course, to utilize the various aspects of this invention, there is no requirement that the systems and methods of the invention actually render a display including one or more polygons with the various objects included therein. Rather, the placement of the "objects" in the polygons can be accomplished transparently by the computer, without actually displaying this information on the screen or display.

CONCLUSION

There are any number of alternative combinations for defining the invention that incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various examples, a certain order to the data has been shown. However, any reordering of the data is encompassed by the present invention.

What is claimed is:

1. A method of estimating overlap between polygons, comprising:

providing a pattern of objects over an entire area of a first polygon;

determining a first amount of the objects that are located within the area of the first polygon;

determining a second amount of the objects that are located within both the area of the first polygon and an area of a second polygon, the first polygon being a bounding area for content and the second polygon being a bounding area for a selection lasso, or the first polygon being a bounding area for a selection lasso and the second polygon being a bounding area for content; wherein the bounding area for content and the bounding area for the selection lasso are displayed on a display device;

determining a ratio of the amount of objects that have been determined by a processor to be within the area of the first polygon to the amount of objects located within both the area of the first polygon and the area of the second polygon;

estimating an overlap of the first polygon with the second polygon based on the determined ratio;

determining a dimension of the first polygon; and providing one or more parallel lines spaced along the dimension of the first polygon, such that the lines intersect the polygon; and for each line, identifying each intersection of the line with the polygon, and locating objects on the line between odd intersections of the line with the polygon and even intersections of the line with the polygon.

2. The method recited in claim 1, wherein the first amount is a number of points that are located within the area of the first polygon, and the second amount is a number of points that are located within both the area of the first polygon and the area of the second polygon.

3. The method recited in claim 1, wherein the pattern is a regular pattern.

4. The method recited in claim 1, wherein the pattern is a random pattern.

5. The method recited in claim 1, wherein the pattern of objects extends outside of the first polygon.

6. The method recited in claim 1, further comprising providing the pattern of objects as a fixed number of objects independent of the area of the first polygon.

7. The method recited in claim 1, further comprising determining whether the content is selected based upon the estimated overlap of the first polygon with the second polygon.

8. The method recited in claim 1, further comprising selecting the content based upon the estimated overlap of the first polygon with the second polygon.

9. The method recited in claim 1, further comprising providing the pattern of objects as a number of objects based upon a size of the first polygon.

10. An apparatus for estimating overlap between polygons, comprising:

a processor that creates a pattern of objects within an entire area of a first polygon;

determines a dimension of the first polygon; and provides one or more parallel lines spaced along the dimension of the first polygon, such that the lines intersect the polygon; and for each line, identifies each intersection of the line with the polygon, and locates objects on the line between odd intersections of the line with the polygon and even intersections of the line with the polygon;

determines a first amount of the objects located within the area of the first polygon;

determines a second amount of the objects located within both the area of the first polygon and an area of a second polygon, the first polygon being a bounding area for content and the second polygon being a bounding area for a selection lasso, or the first polygon being a bounding area for a selection lasso and the second polygon being a bounding area for content; wherein the bounding area for content and the bounding area for the selection lasso are displayed on a display device;

determines a ratio of the amount of objects that have been determined to be within the area of the first polygon to the amount of objects located within both the area of the first polygon and the area of the second polygon; and estimates an overlap of the first polygon with the second polygon based on the determined ratio.

11. The apparatus recited in claim 10, wherein the processor creates a pattern of points.

12. The apparatus recited in claim 10, wherein the processor creates the pattern of objects as a fixed number of objects independent of the area of the first polygon.

13. The apparatus recited in claim 10, wherein the first amount is a number of points that are located within the area of the first polygon, and the second amount is a number of points that are located within both the area of the first polygon and the area of the second polygon.

14. The apparatus recited in claim 10, wherein the pattern is a regular pattern.

15. The apparatus recited in claim 10, wherein the pattern in a random pattern.

16. The apparatus recited in claim 10, wherein the pattern of object is a fixed number of objects independent of the area of the first polygon.

17. A computer-readable storage medium having stored thereon computer-executable instructions for estimating overlap between polygons, the computer instructions when executed causes a processor to perform the following steps:

identifying a pattern of objects arranged over an entire area of a first polygon;

determining a first amount of the objects that are located within the area of the first polygon;

determining a second amount of the objects that are located within both the area of the first polygon and an area of a second polygon, the first polygon being a bounding area for content and the second polygon being a bounding area for a selection lasso, or the first polygon being a bounding area for a selection lasso and the second polygon being a bounding area for content; wherein the bounding area for content and the bounding area for the selection lasso are displayed on a display device; and determining a ratio of the amount of objects that have been determined to be within the area of the first polygon to the amount of objects located within both the area of the first polygon and the area of the second polygon;

estimating an overlap of the first polygon with the second polygon based on the determined ratio;

determining a dimension of the first polygon; and providing one or more parallel lines spaced along the dimension of the first polygon, such that the lines intersect the polygon; and for each line, identifying each intersection of the line with the polygon, and locating objects on the line between odd intersections of the line with the polygon and even intersections of the line with the polygon.

18. The computer-readable storage medium recited in claim 17, having further computer-executable instructions for providing the pattern of objects arranged over the entire area of the first polygon.

19. The computer-readable storage medium recited in claim 17, having further computer-executable instructions for determining the first amount as a number of points that are located within the area of the first polygon, and determining the second amount as a number of points that are located within both the area of the first polygon and the area of a second polygon.

20. The computer-readable storage medium recited in claim 17, having further computer-executable instructions for selecting the content based upon the estimated overlap of the first polygon with the second polygon.

* * * * *